United States Patent
Dai et al.

(12) 
(10) Patent No.: US 6,651,235 B2
(45) Date of Patent: Nov. 18, 2003

(54) SCALABLE, PARTITIONING INTEGRATED CIRCUIT LAYOUT SYSTEM

(75) Inventors: Wei-Jin Dai, Cupertino, CA (US); Kit-Lam Cheong, Palo Alto, CA (US); Hsi-Chuan Chen, Fremont, CA (US); Wei-Lun Kao, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 10/003,595

(22) Filed: Oct. 30, 2001

(65) Prior Publication Data

US 2003/0084416 A1 May 1, 2003

(51) Int. Cl.[7] .............................................. G06F 17/50
(52) U.S. Cl. .................. 716/7; 716/1; 716/2; 716/4; 716/5; 716/8; 716/11; 257/401; 703/14; 714/726
(58) Field of Search ....................... 716/1–21; 257/401; 703/14; 714/726

(56) References Cited

U.S. PATENT DOCUMENTS

| | | | | |
|---|---|---|---|---|
| 5,754,826 A | * | 5/1998 | Gamal et al. .................. 703/14 |
| 6,018,622 A | * | 1/2000 | Lin et al. ....................... 716/2 |
| 6,243,849 B1 | * | 6/2001 | Singh et al. .................... 716/8 |
| 6,249,902 B1 | * | 6/2001 | Igusa et al. .................... 716/10 |

* cited by examiner

*Primary Examiner*—Vuthe Siek
*Assistant Examiner*—Yelena Rossoshek
(74) *Attorney, Agent, or Firm*—Daniel J. Bedell; Smith-Hill and Bedell (57) ABSTRACT

An integrated circuit (IC) layout system initially modifies a netlist describing an IC as a hierarchy of circuit modules to combine clusters of cells forming selected modules so that they form a smaller number of larger cells. This reduces the number of cells forming the IC, thereby reducing the time the system needs to generate an IC layout. The system then generates a trial layout of the IC described by the modified netlist. Based on the shape and position of the area each module occupies in the trial layout, the system estimates the shape and position of a substrate area each module would require in a layout where module areas did not overlap. The system then divides the IC design into several partitions, each including separate set of the modules forming the IC, and creates a partition plan allocating substrate space to each partition based on the estimated space requirement of each module assigned to that partition. The system also creates a timing budget allocating signal path timing constraints among the partitions based on an timing analysis of signal paths delays in the trial layout. Thereafter the system independently lays out each IC partition so that it satisfies that partition's spatial and timing constraints as indicated by the partition plan and timing budget. The partition layouts are then assembled to form a complete IC layout.

32 Claims, 8 Drawing Sheets

SCALABLE, PARTITIONING INTEGRATED CIRCUIT LAYOUT SYSTEM

BACKGROUND OF THE INVENTION

1. Field of the Invention

The present invention relates in general to computer software for automatically generating an integrated circuit layout.

2. Description of Related Art

An IC designer usually begins the IC design process by producing a register transfer language (RTL) "netlist" describing the IC circuit only in terms of the logic it carries out. For example a high level netlist may describe a cell connected to three node A, B and C using the equation C=A*B. This equation indicates only that the cell generates an output signal at node C that is the logical AND of signals appearing at nodes A and B. To test the logic of the circuit described by the netlist, the designer supplies the netlist and a "testbench" file as inputs to a circuit simulator. The circuit simulator then simulates the behavior of the circuit described by the netlist in response to a set of input signals described by the testbench file and produces output data describing the time-dependent behavior of signals at various nodes of the circuit. Since at this level the netlist models only the circuit logic, the simulator is only concerned with simulating circuit logic and does not attempt to simulate circuit timing.

Having used the simulator to verify the logic of the circuit, the designer typically uses a syntheses tools to create a "gate level" netlist that models the circuit as a set of interconnected circuit components (cells), wherein each cell is described by an entry in a cell library. IC components described as library cells may range from individual transistors and small components formed by several transistors such as logic gates up to very large components such as computer processors and memories. The cell library describes not only the logic performed by the cells, but also the time-dependent behavior of the cells. The boolean models of cell behavior are replaced with mathematical models that more accurately reflect the time-dependent behavior of the cells. For example, instead of modeling an AND gate by a simple boolean function C=A*B, a gate level netlist will model the AND gate with a mathematical expression having time as a variable and which describes the gate's input and output signals as analog voltages that change in magnitude over time in response to changes in input signal magnitudes. This more detailed netlist model of the circuit enables the circuit simulator to more accurately verify not only the circuit's logic but also the time-dependent behavior of the circuit. Thus by supplying a gate level netlist as input to a simulator, the designer can use the simulator to determine not only whether the AND gate carries out the required AND function, but also whether it does so quickly enough to meet various timing constraints for the circuit. However since the design at this point does not accurately model signal routing paths between the cells, the simulator output does not accurately take into account signal path delays between the cells.

After using the simulator to verify the time-dependent behavior of the circuit described by the gate level netlist, the circuit designer employs an automated placement and routing (P&R) tool to convert the gate level netlist into an IC layout describing how and where each cell is to be formed in the IC substrate and describing the signal routing paths within the IC that are to interconnect the cells. A typical placement and routing tool uses an algorithm which iteratively moves cells about on the substrate looking for a placement solution in which all cells fit within the substrate area allocated for the placement, that allows room for the routing paths needed to properly interconnect the cells and that satisfies various timing constraints on the circuit.

Once a P&R tool has created an IC layout satisfying all constraints, the designer may use a conventional netlist compiler to convert the layout back into another "layout level" netlist that accurately models the time-dependent behavior not only of the cells forming the IC but also of the routing structures that interconnect the cells. The designer may then again use a circuit simulator and other tools to verify the behavior of the circuit before sending the completed IC layout to an IC manufacturer.

Placement and Routing Tools

Figure 1:
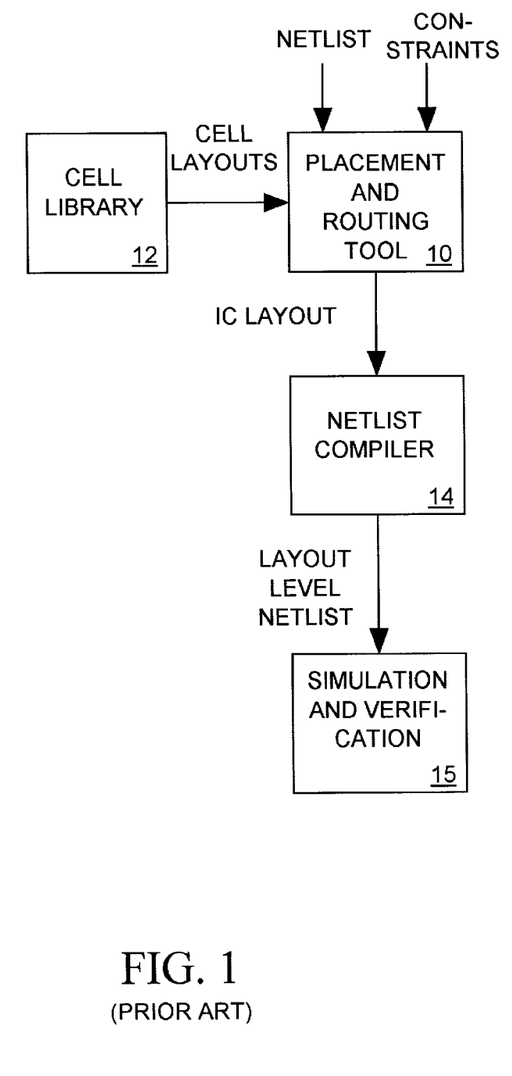
FIG. 1 is a data flow diagram illustrating a prior art integrated circuit (IC) layout system.

As illustrated in FIG. 1 a placement and routing tool 10 converts a gate level netlist design of an integrated circuit into an IC layout satisfying various timing and spatial constraints supplied as input to the tool. A cell library 12 tells P&R tool 10 how to layout each cell referenced by the netlist and the P&R tool 10 determines an appropriate position within an IC substrate for each cell. P&R tool 10 also designs the routing structures that interconnect the cells. A netlist compiler 13 may then convert the IC layout back into a layout level netlist for use by simulation and verification tools 15.

One way P&R tool 10 could determine an appropriate cell layout would be to randomly choose cell placements until it finds a placement that permits the cells to be appropriately interconnected in a manner that satisfies the various timing and other constraints. However for large ICs, it can take too long for a P&R tool to find a suitable placement by randomly generating and testing various cell placements to see if they can be appropriately routed. However various algorithms have been developed that reduce the amount of time a P&R tool needs to find acceptable cell placement.

Figure 2:
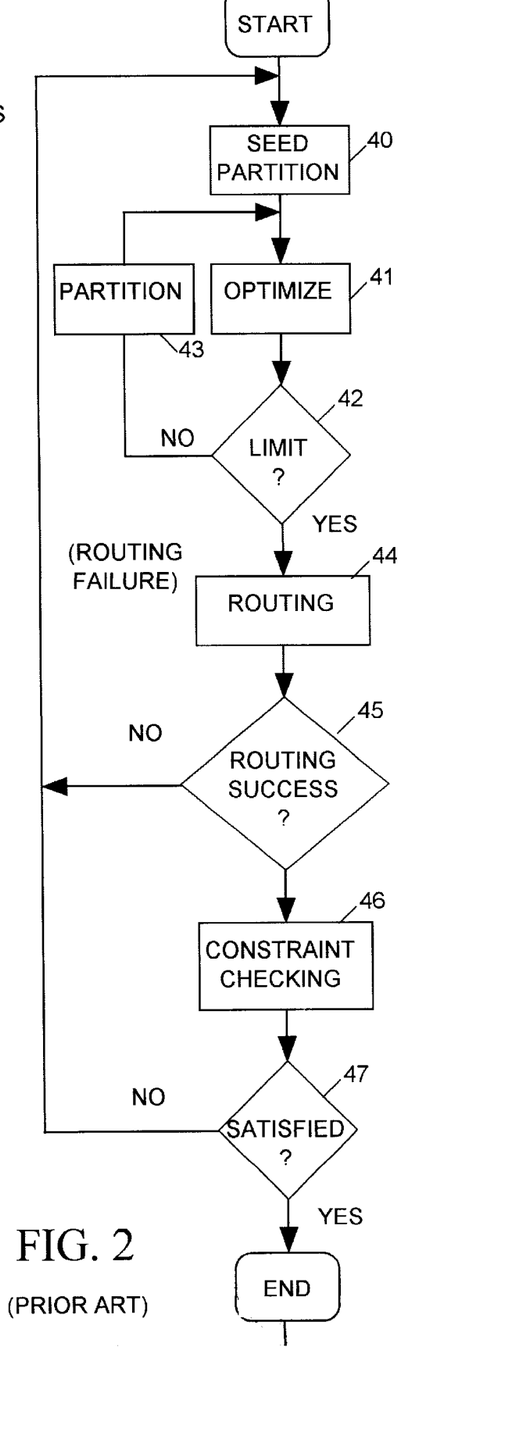
FIG. 2 is a flow chart illustrating the prior art placement and routing tool of FIG. 1 in more detail.

FIG. 2 is a flow chart illustrating the process carried out by a typical P&R tool when generating an IC layout. The P&R tool makes use of a widely used placement and routing procedure making use of the well-known "min-cut" algorithm (steps 40–43) for generating a cell placement in an IC substrate. The basic approach of the min-cut algorithm is to progressively divide the substrate area into smaller and smaller partitions and to allocate cells to each partition after each division in an attempt to minimize the number of connections between cells that must pass between partitions. This system helps to minimize the lengths of signal paths between cells by attempting to position highly interconnected cells near one another. Keeping signal paths short improves the chance that the P&R tool will be able to establish suitable routing paths between the cells because the routing paths require less space. Also since short paths have low signal path delays, keeping signal paths short improves the chances that the IC layout will satisfy various timing constraints.

Figure 3:
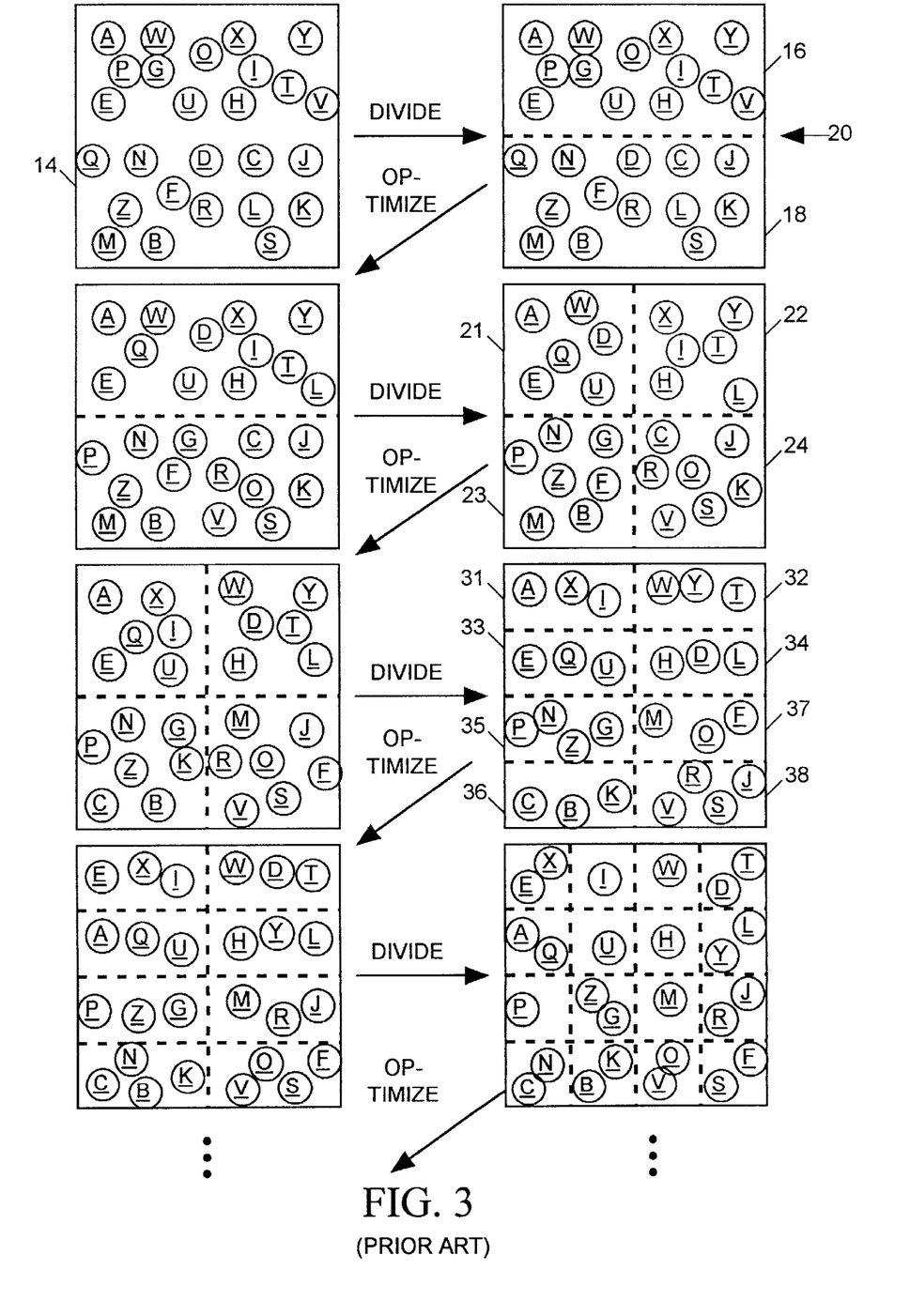
FIG. 3 is a pictorial illustration of a prior "min-cut" process employed by the placement and routing tool of FIG. 2.

FIG. 3 is a pictorial illustration of the min-cut process. Although ICs typically have thousands or millions of cells, for simplicity the example of FIG. 3 assumes the IC design includes only 26 cells A–Z that are to be placed fit within a substrate area 14. The first step of the process is to divide the substrate into two partitions 16 and 18 and randomly assign cells A–Z to the two partitions, thereby creating an initial "seed partitioning" 20. The placement algorithm then tries to optimize the manner in which cells are allocated to the two partitions 16 and 18 by moving cells from partition-to-partition trying to find a placement that minimizes the number of cell-to-cell connections that cross between the two partition. For large ICs it would take too long to try all possible placement, so in many systems each cell is moved only once between partitions.

After attempting to optimize the placement of cells between the two initial partitions 16 and 18, the algorithm divides partition 16 into two partitions 21 and 22 and divides partition 18 into two partitions 23 and 24. It then tries to minimize the number of connections that cross partition lines between partitions 21 and 22 and by moving cells between partitions 21 and 22. The system will also try to minimize the number of connections crossing partition lines between partitions 23 and 24 by moving cells between them. Since partitions 21 and 22 divide partition 16, the system is free to move any cell from partition 22 to partition 21. However it will not try moving any cell from partition 22 to partition 24 since partitions 22 and 24 are not derived from the same parent partition.

After optimizing the cell placement within partitions 21–24, the system divides each partition 21–24 in half to produce a set of eight partitions 31–38 and repeats the optimization process. Note that the system may move cell A from partition 31 to partition 32 because partitions 31 and 32 are derived from the same parent partition 21. However the system is not free to move cells from partition 31 to partition 33 because the two partitions have a different parent partitions. The iterative process of dividing and optimization continues until the number of cells per partition falls below a predetermined limit.

Steps 40–43 of FIG. 2 depict the min-cut process illustrated in FIG. 3. The P&R tool establishes the seed partition at step 40, optimizes the partition at step 41, and then (step 42) determines whether the number of cells per partition has fallen below the predetermined lower limit. If not, the system partitions the substrate again (step 43) and repeats the optimization step 41. The tool iteratively repeats steps 41–43 until partitions reach their lower size limit at step 42.

After using the min-cut algorithm to place the cells, the P&R tool tries to lay out signal paths for interconnecting the cells (step 44). If the P&R tool is able to successfully lay out all necessary signal paths (step 45) based on the layout developed at steps 40–43, then the layout is analyzed (step 46) to determine whether it meets all timing and other constraints. If all constraints are satisfied (step 47) the placement and routing process ends. However if a successful routing plan could not be developed (step 46), or if the IC layout does not satisfy all timing and other constraints (step 47), then the process starts over again at step 40 by choosing another seed partition. Since the IC layout to be routed at step 44 is a direct result of the seed partition randomly selected at step 40, different seed partitions selected at step 40 are likely to result in a different IC placement and routing plans. Thus the P&R algorithm searches for an acceptable IC layout by randomly choosing a succession of seed partitions and testing whether each seed partition results in a placement that can be successfully routed and which meets various circuit timing and other criteria. While the min-cut algorithm randomly chooses seed partitions, the iterative partitioning and optimization process increases the likelihood that the randomly chosen seed partition will result in an acceptable layout. The min-cut approach will typically find a suitable layout more quickly than a system that randomly chooses placement plans to be routed. However it still can be time-consuming, particularly when the IC includes a large number of cells.

Clustering

In general the more cells an IC includes, the longer it takes a placement algorithm to produce a placement plan based on a seed partition. Hence if a designer can reduce the number of cells the algorithm must place, he or she can reduce the time the placement algorithm needs to generate each placement alternative.

Figure 4:
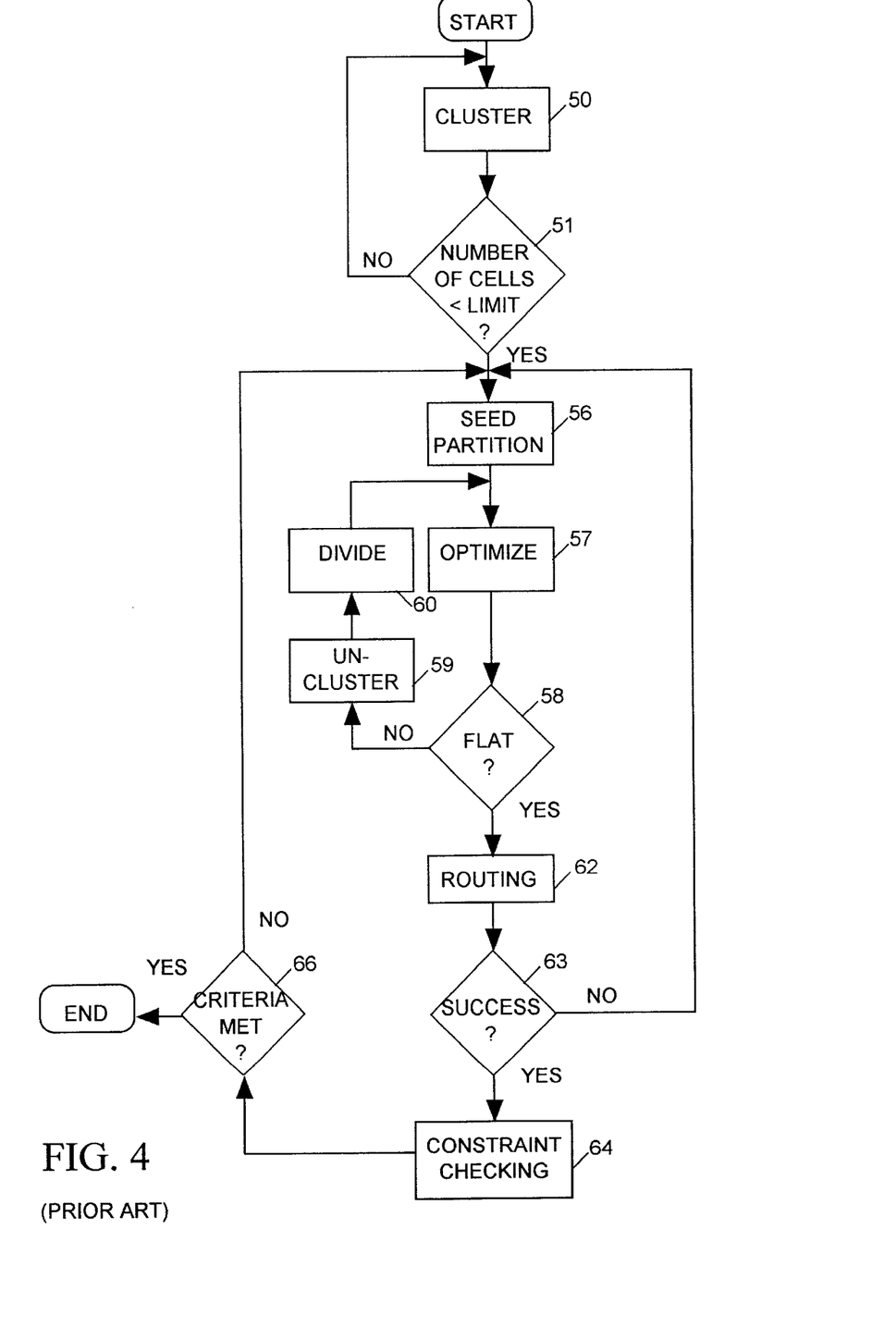
FIG. 4 is a flow chart illustrating a prior art placement and routing process employing an min-cut placement algorithm making use of clustering to reduce processing time.

FIG. 4 illustrates a P&R process employing an improved min-cut placement algorithm described by the paper entitled "Multilevel Circuit Partitioning" by Alpert et. al, published in 1997 by the Design Automation Conference. The algorithm describes an improved min-cut algorithm requiring less time to produce a placement plan from a seed partition. The algorithm first organizes the IC's cells into a set of "clusters" (step 50), wherein each cluster includes one or more cells. Each cluster including more than one cell is then redefined at step 50 as a single cell having a particular area and shape based on the size and shape of its constituent cells. The algorithm is biased towards grouping cells that are highly interconnected with one another together into the same cluster, and is also biased toward grouping the smallest cells into clusters.

The number of clusters is selected to be only about 10% smaller then the number of cells, so the result of the clustering process carried out at step 50 causes only a 10% reduction in the number of cells. If the number of cells is not less than a predetermined limit (step 51) then the algorithm repeats the clustering process (step 50) to further reduce the number of cells. The algorithm continues to loop through steps 50 and 51 until the number of cells falls below the threshold level.

Figure 5:
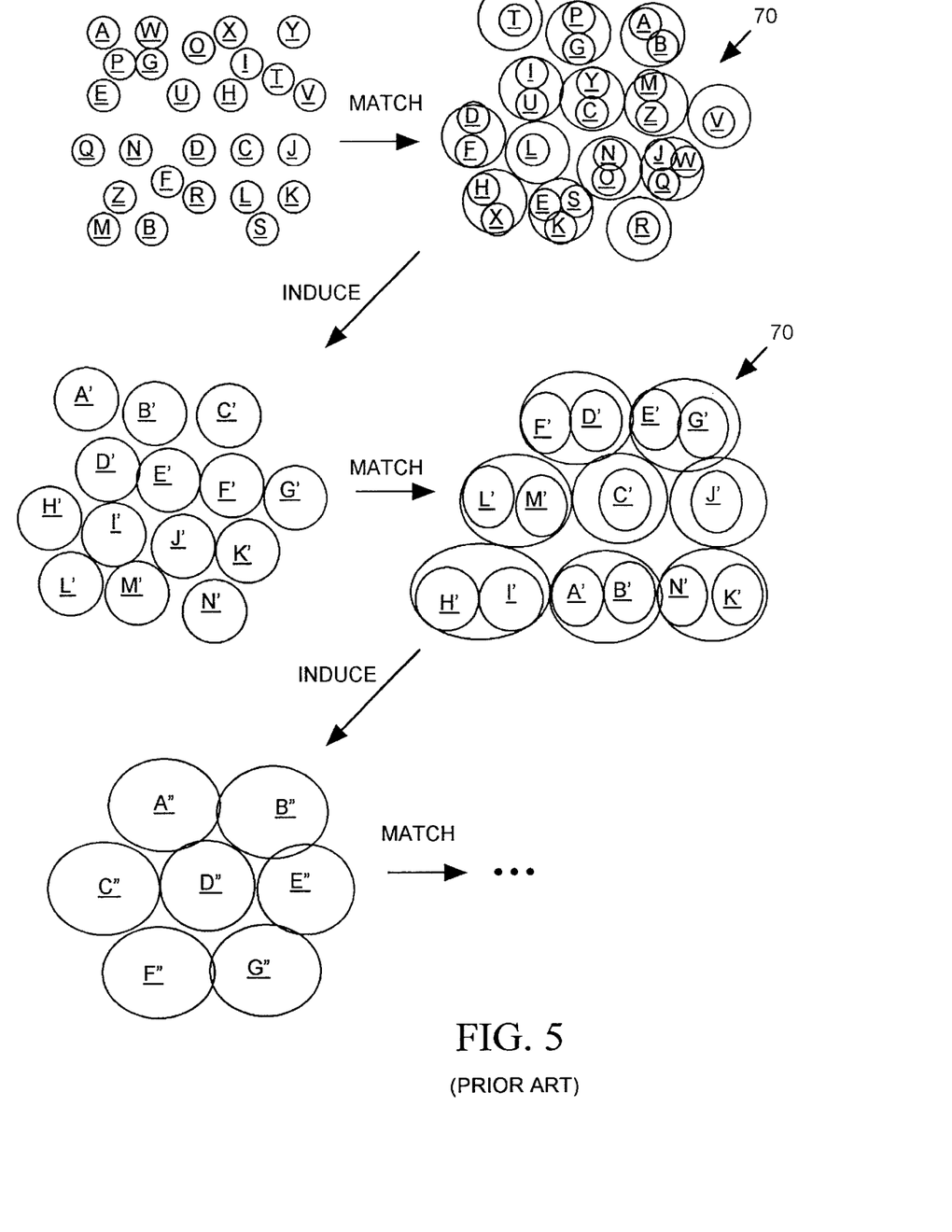
FIG. 5 is a pictorial illustration of the clustering process employed by the placement and routing process of FIG. 4, FIGS. 6-8 are pictorial illustrations of a clustering process employed by an IC layout in accordance with the invention.

FIG. 5 graphically illustrates the clustering process. A group of cells A–Z are initially assigned ("matched") to a set of clusters 70. A modified circuit design is then "induced" by redefining clusters 70 as a new, smaller set of cells A'–N'. The matching process is then repeated to produce a new set of clusters 72, and the circuit design is again modified to redefine clusters 72 as a set of cells A"–G".

Referring again to FIG. 4, when the number of cells falls below the threshold level at step 51, the algorithm creates a seed partition (step 56) and then optimizes placement of cells between the partitions (step 57) as in a convention min-cut algorithm. The P&R system can carry out the optimization process (step 57) relatively quickly because the "clustered" IC design has substantially fewer cells than the original (non-clustered) IC design. After optimizing the seed placement at step 57, the system determines (step 58) whether the design is flat (i.e. unclustered). Since at this point the design is still clustered, the algorithm moves to step 59 which rolls back the last iterative clustering performed at step 50, thereby slightly increasing the number of cells in the design. The current partitions are then divided to form new partitions (step 60) and the cell placement within the new partitions is then optimized at step 57. The design is again processed at step 59 to remove the clustering produced by the second-to-last iteration of step 50. The current partitions are then divided once again at step 60 and optimized at step 57. Thus with each pass through steps 57–60, the algorithm not only divides the substrate into smaller partitions as in conventional min-cut algorithms, it also rolls back the clustering carried out at step 50 by one level, thereby increasing the number of cells in the design with each pass.

The placement process ends at step 58 when the design has returned to its original flat, unclustered, state. A routing plan is then generated (step 62), and if the routing plan successfully links all of the cells (step 63), the layout is analyzed to determine whether it satisfies all constraints (step 64). If not, or if the system is unable to successfully route the layout (step 63), then the placement and routing process (steps 56–66) is repeated.

While the clustering and unclustering steps 50 and 59 require processing time, cell clustering substantially reduces the time needed for each pass through the optimization step 57 and the processing time saved at step 57 more than offsets the processing time required to perform steps 50 and 59. Thus the clustering process improves the speed with which the P&R tool is able to generate layouts.

As mentioned above, the system is biased toward including cells that are highly interconnected with one another into the same cluster at step 50. This is beneficial because it anticipates what the min-cut placement process tries to do—keep highly interconnected cells close together. Clustering only the most highly interconnected cells together therefore maximizes the likelihood that cells would end up in the same partition after each pass of optimization step 57 regardless of whether they had been grouped into clusters. Thus while clustering cells increases the speed of the min-cut placement process, it does not significantly affect its outcome.

An IC designer often creates RTL and gate level netlists that are hierarchical in nature, grouping various cells into modules which may themselves be grouped into progressively higher level modules. For example a computer processor module may include many submodules such as registers, instruction decoders, cache memories and the like, which in turn may be formed by lower level modules or individual cells. RTL and gate level netlists for large IC designs can have many hierarchical levels.

However conventional layout tools ignore the hierarchical nature of netlists. Since they are interested only in placing and routing individual cells, they typically "flatten" the netlist to a single level, so that it describes the design only in terms of a collection of interconnected cells without any reference to a module hierarchy.

Thus when assigning cells to clusters at step 50, the algorithm of FIG. 4 determines which cells are highly interconnected simply by counting the number of connections between the cells as indicated by the netlist. The fact that the two cells may or may not be a part of the same module is irrelevant to the decision. Of course the system will frequently group cells of the same module into the same cluster because cells forming the same module tend to be highly interconnected with one another. However cells belonging to different modules can often be highly interconnected, such as for example cells forming module input/output terminals. Thus the algorithm of FIG. 4 can also often group cells of different modules into the same cluster. This is not problematic in the context of the layout system of FIG. 4 where the notion of modular hierarchy is irrelevant to the layout. However grouping cells of different modules into the same cluster prior to generating an IC layout can be a problem when the layout tool does take into account the hierarchical nature of the design.

Design Partitioning

As ICs become progressively larger computers carrying out the automated placement and routing phase of the design process require progressively longer amounts of time to lay out ICs. As mentioned above, one way to reduce processing time when laying out an IC is to employ clustering. Another way a designer can reduce the time required to lay out an IC is to divide the circuit design into two or more partitions and to separately lay out each partition. (Note that in this context the word "partition" applies to a portion of the IC design, whereas in the context of the above-described min-cut placement process, the word "partition" applies to a portion of the substrate area in which cells of an IC are placed.)

Since the time required to lay out an IC increases geometrically with the number of cells forming the IC, it can be much faster for a P&R tool to successively layout M partitions of an IC having N cells each than to layout the entire IC having M*N cells. Further speed improvements can be had by using a separate layout tools to concurrently lay out the partitions.

However this approach is problematic because the designer may have difficulty accurately estimating an appropriate size, shape and position of the substrate area allocated to each partition and may have difficulty allocating timing constraints for the partitions. When a designer imposes a timing constraint on an IC design, the constraint typically specifies that a signal path formed by a set of cells connected between two circuit nodes A and B may have a signal path delay no greater than some maximum limit. The placement and routing tool tries to lay out the IC so that it satisfies all timing constraints. However when the design is divided prior to placement and routing with node A appearing in one partition and node B appearing in another partition, then the designer must also divide the constraint among the partitions, allocating portions of the maximum allowable signal path delay to portions of the signal path residing in and between the partitions. It can be difficult and time-consuming for the designer to determine how much of that maximum signal path delay to allocate to each partition.

Thus what is needed is a system for automatically partitioning a hierarchical netlist description of a circuit in a way that enables P&R tools to quickly and efficiently produce layouts for the design partitions satisfying circuit timing and other constraints. Moreover it would be helpful to combine partitioning with clustering to obtain the speed benefits of both techniques. However, referring again to FIG. 4, when assigning cells to clusters at step 50, the prior art clustering algorithm of FIG. 4 determines which cells are highly interconnected simply by counting the number of connections between the cells as indicated by the netlist. The fact that the two cells may or may not be a part of the same module is irrelevant to the decision. The system will tend to group cells of the same module into the same cluster because cells forming the same module tend to be highly interconnected with one another. However since cells belonging to different modules can also be highly interconnected, cells belonging to different modules can be assigned to different clusters. This is not problematic in the context of the layout system of FIG. 4 where the notion of modular hierarchy is irrelevant to the layout. However in a system that partitions designs along modular lines, grouping cells of different modules into the same cluster prior to partitioning the design causes a problem.

Thus what is needed is a system for converting a hierarchical netlist description of the IC into an IC layout that uses both partitioning and a form of clustering to speed up the layout process and which automatically allocates timing constraints among the partitions in an appropriate manner.

BRIEF SUMMARY OF THE INVENTION

An integrated circuit (IC) layout system in accordance with the invention initially modifies a gate level netlist describing an IC as a hierarchy of circuit modules to combine clusters of cells included within selected modules so that they form a smaller number of larger cells. Only modules comprising a number of cells falling within a predetermined first cell count range are subjected to clustering, and the average number of cells included in each cluster is selected so that the total number of cells in the design after clustering falls within a predetermined second cell count range. Thus regardless of the number of cells included in the original netlist, the number of cells included in the modified "clusterized" netlist remains the about same. Since the time required to perform an IC layout depends to a large extent on the number of cells in the IC design, clustering the design in this manner renders the subsequent layout process "scalable": the complexity of the placement routing process remains substantially the same regardless of the size (number of cells) forming the IC because the clustering process reduces all large IC designs to approximately the same number of cells.

The clustering process respects the hierarchical nature of the design; it does not blur the lines between modules subjected to clustering by incorporating cells of more than one module into the same cluster. Thus after employing clustering to reduce the complexity of the netlist, the system is able to divide the netlist along modular lines to produce two or more netlists, each describing a separate partition of the IC design. The system then independently lays out each partition and thereafter combines them to form a full IC layout.

The designer specifies which modules are to be included in each partition, and the layout system automatically produces a partition plan including a floor plan allocating an area of semiconductor substrate to each partition and a pin assignment plan indicating points along the boundary of each partition area at which input/output signals cross.

To create the partition plan, the system first generates a trial layout of the IC that the modified netlist describes. Based on the shape and position of overlapping areas various modules occupy in the trial layout, the system estimates the shape and position of a substrate area each such module would require in a layout where module areas did not overlap. The system then creates a floor plan allocating substrate space to each partition based on the estimated space requirement of each module assigned to that partition. It also creates a pin assignment plan, selecting points at which signal paths cross partition boundaries based on the positions of the signal paths in the trial layout. The system also creates a timing budget allocating signal path timing constraints among the partitions based on an timing analysis of signal paths delays in the trial layout.

Thereafter the system divides the netlist to create a separate netlist for each partition and then independently lays out each IC partition so that it satisfies that partition's spatial and timing constraints as indicated by the partition plan and timing budget. The system then assembles the partition layouts into a complete top-level IC layout.

Since cells are clustered in a manner that respects module boundaries, the system can cluster the cells before partitioning the design. Thus by clustering cells, the system not only reduces the time it needs to generate the partition layouts, it also reduces the time it needs to develop a partition plan because it reduces the time it needs to generate the trial layout providing information needed to develop the partition plan.

It is accordingly an object of the invention to provide a system for clusterizing a netlist description of an IC design in a manner that respects modular boundaries.

It is another object of the invention to provide a system for generating an IC layout that makes use of both clustering and design partitioning to reduce processing time.

The claims appended to this specification particularly point out and distinctly claim the subject matter of the invention. However those skilled in the art will best understand both the organization and method of operation of what the applicant(s) consider to be the best mode(s) of practicing the invention, together with further advantages and objects of the invention, by reading the remaining portions of the specification in view of the accompanying drawing(s) wherein like reference characters refer to like elements.

DETAILED DESCRIPTION OF THE INVENTION

The present invention relates to computer instructions, stored on computer readable media such as for example a hard disk or one or more compact disks, which when read and executed by a conventional computer generate a layout for an integrated circuit (IC) described by a hierarchical netlist. This specification describes one or more exemplary embodiments and/or applications of the invention considered by the applicant(s) to be the best modes of practicing the invention.

Hierarchical IC Designs

Figure 6:
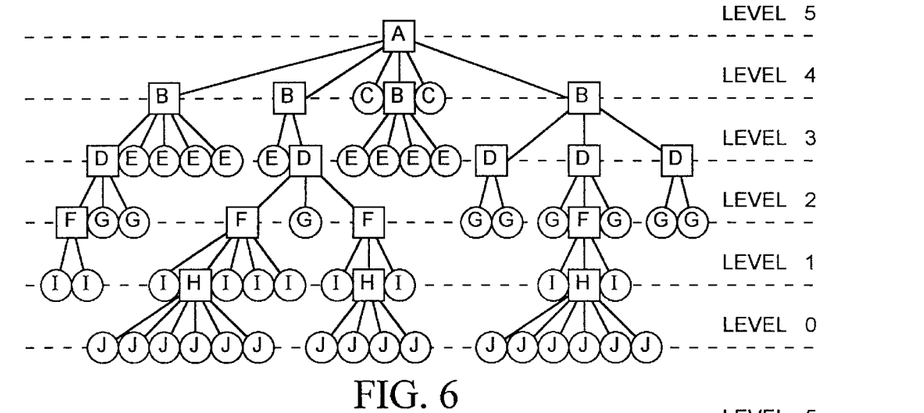

An integrated circuit (IC) designer creates an IC design in the form of a gate level hardware description language (HDL) netlist listing the nodes of the IC and describing the various electronic components ("cells") that are connected between the nodes. Designers usually find it convenient to organize an IC design into a hierarchy of interconnected logic modules wherein collections of cells are grouped into modules, and collections of modules are grouped into higher level modules. FIG. 6 illustrates how a hierarchical netlist might organize a portion of a circuit formed by 46 cells (represented by small circles) into hierarchy of 17 logic modules (represented by small squares). IC designs typically include thousands of cells but the simple example of FIG. 6 having 46 cells as illustrated in FIG. 6 is sufficient to illustrate a hierarchical design. FIG. 6 shows that a single module A at the highest level of the hierarchy (level 5) is formed by a set of four level 4 modules B and two individual cells C. A set of five modules D and nine individual cells E at level 3 form models B of level 4. Four of modules F and nine cells G at level 2 form models D. Three models H and ten cells I at level 1 form the level 2 modules F. Sixteen cells J at the lowest hierarchical level 0 form the level 1 modules H.

After creating a gate level netlist, the designer uses a placement and routing tool to convert the gate level netlist into an IC layout indicating where each cell of the design is to be placed within a semiconductor substrate and describing the conductive paths that are to route signals between the cells. However while a gate level netlist description of an IC design may be organized into a hierarchy of modules, a typical placement and routing tool ignores the hierarchical nature of the design and positions each cell in the substrate without regard to its place within the design hierarchy.

A layout system in accordance with the invention has two features that speed up the layout process. First it allows a user to specify that the system is to divide the design into more than one partition and to separately layout each partition. Since the time required to layout an IC increases rapidly with the number of cell included in the IC, a layout system in accordance with the invention can usually produce an acceptable layout for each partition in turn faster than a prior art system can generate a layout for the entire IC. Further speed improvements may be had when the partition layouts are generated concurrently.

The second feature of the layout system in accordance with the invention that speeds up layout process is that prior to laying out the IC it groups collections of highly interconnected cells into clusters, and then redefines each cluster as a cell. This reduces the total number of cells that the system must lay out and therefore reduces the time it needs to generate a layout.

As described below, the manner in which the netlist organizes cells into modules, the manner in which the system partitions the design and clusters cells are all interrelated.

Clustering

Some prior art layout systems temporarily cluster cells they find to be highly interconnected during initial stages of the placement and routing process to reduce the number of cells that must be placed and routed. With fewer cells to place and route, a layout system employing clustering is able to quickly produce a "low resolution" IC layout establishing approximate positions of clusters of cells but not the positions of individual cells within the clusters. Having produced the low resolution layout, the prior art routing system progressively "de-clusters" the cells so that it can place and route each cell, thereby producing a high resolution layout in which each individual cell is appropriately placed and routed. This clustering/de-clustering process generally lowers the total time needed to place and route an IC design.

A layout system in accordance with the present invention also employs clustering to reduce the number of cells that must be placed and routed. However when it groups cells into clusters, it fixes the cell layout within each cluster before the start of the layout process. Thereafter the system need not de-cluster the cells and individually place and route them after having placed and routed the clusters they form.

Since it carries out the clustering process before the start of the placement and routing process, the layout system of the present invention does not make use of information acquired during preliminary stages of the placement and routing process to discover which cells are highly interconnected so as to determine how cells ought to be grouped into clusters. Instead the layout system clusters cells according to their positions in the netlist design hierarchy. Since cells that are closely related in the design hierarchy tend to be highly interconnected, they are good candidates for clustering.

Prior art clustering layout systems try to group the most highly interconnected cells into the same cluster, and while cells of the same module often tend to be highly interconnected, prior art clustering systems do not respect module boundaries when forming clusters. Cells of different modules can be included in the same cluster when they are highly interconnected. Since the layout system in accordance with the invention respects module boundaries when forming clusters, the modules can be later separated into different partitions that may be separately placed and routed.

Figure 7:
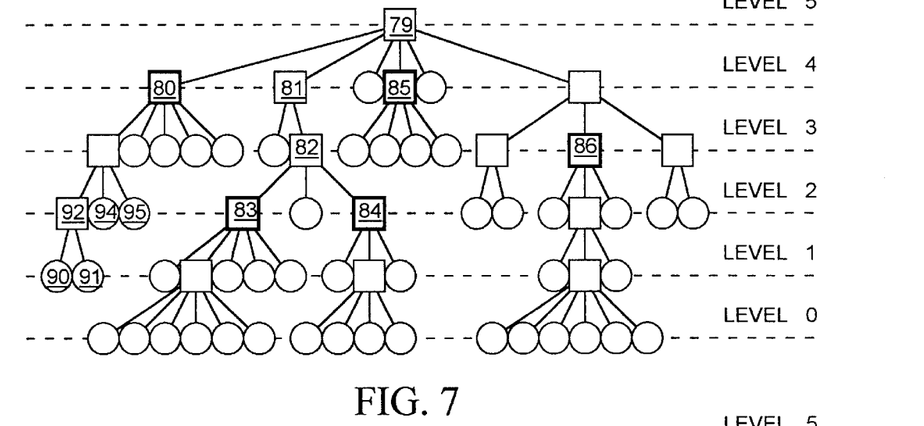
Figure 8:
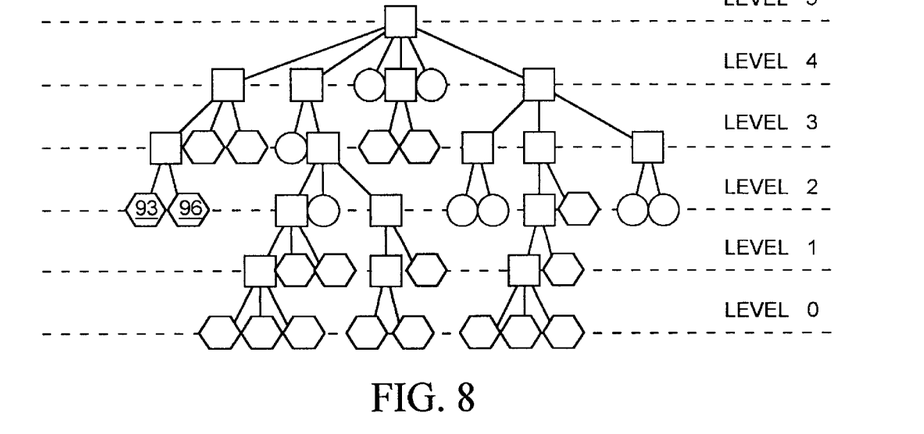

FIGS. 7 and 8 illustrates how a layout system in accordance with the invention organizes cells of the design hierarchy of FIG. 6 into clusters. The first step of the clustering process is to identify the highest level modules having a number N of cells lying within a predetermined range. Cells of those modules will be grouped into clusters. In this simple example the range of N is selected to be from 6 to 10, though in practice where modules are much larger, the lower and upper limits of the range will be much larger. Thus in this example the layout system looks for the highest level modules having from 6 to 10 cells.

To do so the system traverses the modular hierarchy starting with the module 79 at the highest level (level 5) of the hierarchy. Since module 79 includes more than ten cells, it is not selected as a "clusterable" module. The system therefore looks at all of the modules on the next lower level of the hierarchy (level 4) which are included within module 79, starting with module 80. Since the system finds that module 80 includes a total of eight cells residing on levels 1–3 it identifies module 80 as a "clusterable" module. The system then looks at the next module 81 of level 4 and finds that it includes more than 10 cells and therefore does not select module 81 as a clusterable module. Instead the layout system looks at module 82 on level 3 to determine whether it includes from 6 to 10 cells. Since it also has more than 10 cells, the system checks the modules 83 and 84 forming module 82 and finds that the number of cells with each of those modules is within the range 6 to 10. The system therefore chooses both modules 83 and 84 as clusterable modules. As the system continues to traverse the hierarchy in a similar manner it finds modules 80, 83, 84 85 and 86 to be clusterable modules. (FIG. 7 depicts clusterable modules using boxes having thick borders.)

The system next decides how many cells to include in each cluster. To do so the system chooses a target total number M of cells to be included in the design after clustering. Making M small speeds up the layout process, but it also reduces the flexibility that the system has in finding an layout satisfying all placement and routing criteria. For large ICs including more than a million cells, a value of M of about 300,000 typically produces good results. However in the simplified example herein, where the IC includes only 46 cells, we choose M to be 30.

Next the system counts the number P of cells outside clusterable modules and the number Q of cells inside cluster modules. In the example, P=6 and Q=40. Given the values of P, and M, the system calculates a "cluster ratio" as follows:

$$R=RND[Q/(M-P)]$$

where RND[ ] is a rounding function that rounds its argument to the nearest integer. The cluster ratio R indicates a target number of cells that are to be included in each cluster. In this example $$R=RND(40/(30-8))=2.$$

Hence the system will try to form clusters having two cells each from the cells forming each clusterable module. In practice, however, R will be a larger number, for example 5–10, and the system will try to make clusters having 10 cells each, although it may form some clusters having slightly more or slightly less than 10 cells when the number of cells within a clusterable module is not an even multiple of 10. Thus the clustering process reduces the number of cells in the design to approximately M by grouping cells into clusters all of which include approximately the same number (R) of cells.

FIG. 8 illustrates the result of the clustering process in which small hexagons represent cell clusters. Note for example that module 92 of FIG. 7, which included two cells 90 and 91, was converted into a single cluster 93 as shown in FIG. 8. Cells 94 and 95 of FIG. 7 are grouped into a single cluster 96 of FIG. 8. Thus whereas the unclustered design of FIG. 7 includes 46 cells, the clustered design of FIG. 8 includes 19 clusters and 8 unclustered cells for a total of 27 "cells" that must be placed and routed—close to the target number M=30.

Partition Limitations on Clustering

At the beginning of the layout process, when the designer provides the layout system with the gate level netlist, the designer also supplies the system with a partition specification indicating how many partitions of the IC design are to be separately laid out and indicting which modules of the design are to be included in each partition. Thus when initially clustering the design, the layout system avoids creating clusters that cut across partition lines. This normally does not pose much of a restriction on clustering since clustering normally occurs at lower levels of the design hierarchy while partitioning normally occurs at higher levels of the design hierarchy. However the partition specification also places a more subtle restriction on clustering that is related to timing constraints.

Figure 9:
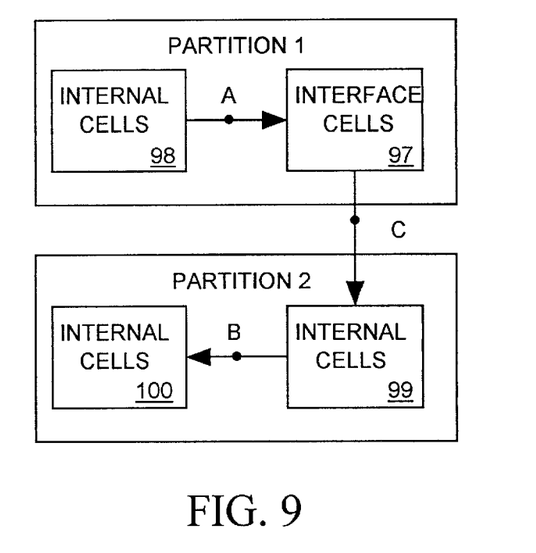
FIG. 9 is a block diagram illustrating two interconnected partitions of an IC design.

FIG. 9 illustrates two partitions 1 and 2 having only a single interconnection. Partition 1 includes a set of "interface" cells 97 forming a signal path between a node A within partition 1 and a node C between partitions 1 and 2. All other cells of partition 1 are classified as "internal" cells 98. Similarly partition 2 includes a set of "interface" cells 99 forming a signal path between a node B within partition 2 and node C. All other cells of partition 2 are classified as "internal" cells 100. The designer has placed a timing constraint on the signal path between nodes A and B; a signal must be able to traverse that path within some maximum allowable time specified by the timing constraint. Thus it is necessary for the layout system to place the interface cells 97 and 99 forming the path between nodes A and B so as to satisfy the timing constraint. To provide the layout system with maximum flexibility during the layout process to position interface cells so as to meet a timing constraint, the layout system refrains from clustering interface cells prior to carrying out the layout process. In that regard, the system treats as an interface cell any cell within any time constrained signal path between two partitions.

Modular Partitioning

In addition to clustering cells prior to placement and routing, a layout system in accordance with the invention also partitions the design along modular lines as specified by the designer, so that each partition can be independently placed in a separate, identifiable area of the substrate. To do so the layout system estimates the size, shape and position of the area needed for each partition and then separately performs placement and routing for each partition. This has two advantages. First, it can help to speed up the layout process by reducing a big layout to several small ones. The time required to find an acceptable placement and routing solution is a geometric function of the number of cells to be placed and routed. Hence when a design is divided into several partitions, with each partition being separately placed and routed, the total processing time needed to separately place and route all partitions is typically much less than the processing time that would be needed to place and route an entire unpartitioned design. Further speed improvements can be had when the partitions are concurrently placed and routed using parallel processing.

The second advantage to partitioning becomes apparent when a designer makes small changes to an IC design for which an IC layout has already been produced. This happens, for example, when small portions of an IC design must be occasionally modified to customize the IC for particular applications. When the layout has been performed on an unpartitioned design, cells of various modules are intermingled to some extent in the substrate, and any change to the design makes it necessary to completely redo the layout for the entire IC. However when modules are placed in separate areas of the substrate with the cells forming those modules being independently placed and routed, it is possible to modify the design of one module without having to redo the layout for the entire IC; only the layout for the partition containing the changed module need be redone.

Layout System

Figure 10:
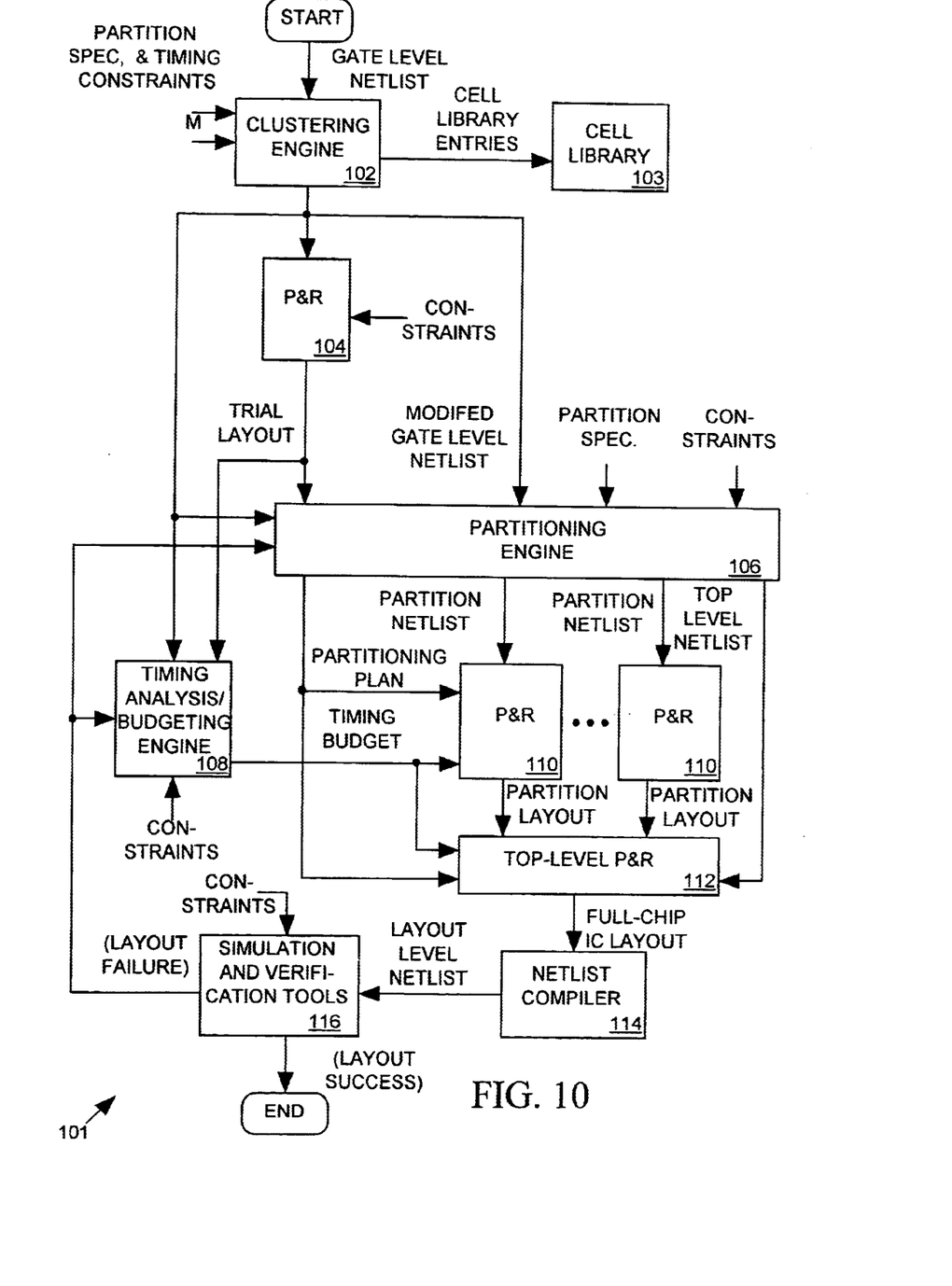
FIG. 10 is a data flow diagram illustrating an IC layout system in accordance with the invention, FIGS. 11-13 pictorially illustrate an example of hoe the layout system of FIG. 9 allocates semiconductor substrate space to partitions of an IC design.

FIG. 10 is a data flow diagram illustrating a layout system 101 in accordance with the invention which both clusters and partitions a hierarchical netlist design along modular lines and then separately places and routes each partition. Initially a clustering engine 102 converts the hierarchical netlist into a modified netlist in which selected cells are grouped into clusters in the manner described above so that the total number of cells included in the design is approximately the value of the parameter M supplied as input to clustering engine 102. As discussed above, clustering engine 102 refrains from grouping cells assigned to different partitions into the same cluster and also refrains from clustering "interface" cells forming time constrained signal paths passing between partitions.

Each cluster of cells of the hierarchical netlist becomes an individual cell of the modified netlist. Each cell that may be incorporated into a design is described by a separate cell library entry describing how the cell is formed in a semiconductor substrate and including various information about the cell including its size, shape and timing characteristic. Placement and routing tools may thereafter consult the cell library to determine the size and shape of the cells and timing analysis tools may thereafter consult the cell library when analyzing IC layout to determine whether they meet various timing constraints.

After clustering engine 102 produces the modified netlist, a P&R tool 104 processes the clustered netlist to produce a "trial" layout for the entire IC, including a trial placement and a trial routing. P&R tool 104 suitably employs the well-known "min-cut" algorithm that iteratively alters cell placements to determine whether it can find a placement that permits the cells of the entire IC to be properly interconnected and which satisfies various spatial and timing constraints. If allowed to operate long enough, the P&R tool 104 could converge on a flat placement and routing solution meeting all timing constraints. However and P&R tool 104 is not given enough time to do that.

The min-cut algorithm P&R tool 104 employs tends to place highly interconnected cells near one another in the semiconductor substrate. Highly interconnected cells tend to move close together relatively quickly in the process, and P&R tool 104 need not run long before that happens. Thus while the trial layout P&R tool 104 produces will normally not run long enough to satisfy all of the IC's timing constraints, it will tend to group highly interconnected cells together. Since cells forming a module of the hierarchical design tend to be highly interconnected, the cells of each given module tend to cluster together in the trial layout.

A partitioning engine 106 uses the trial layout as a guide developing an IC floorplan allocating an area of substrate space to each partition defined by the partition specification and for creating a pin assignment plan indicating points along the boundaries of each partition at which inter-partition signal paths terminate.

Figure 11:
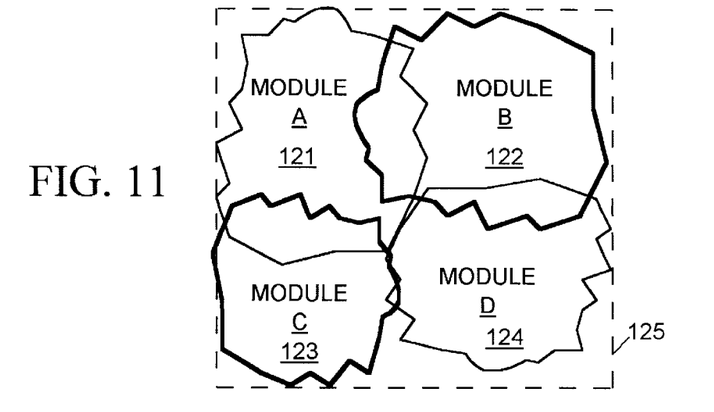
Figure 12:
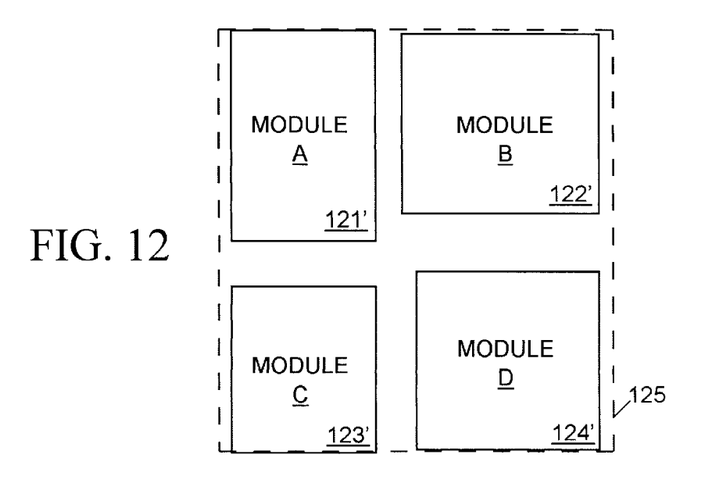

FIG. 11 illustrates a simple example of a trial layout within a substrate 125 of four modules A–D at a level of a design hierarchy at which the design is to be divided into two partitions. The partition specification calls for modules A and B to be included in one partition and for modules C and D to be included in the other partition. Since cells forming a module tend to be highly interconnected, they tend to cluster together in the trial layout. However the areas 121–124 occupied by cells forming the four modules A–D, respectively, tend to be somewhat amorphous in shape and they overlap with one another to some extent. Partitioning engine 106 can nonetheless make a reasonably good estimate of size and shape of more regular areas of the substrate that can accommodate the module based on the relative size and shape of the area occupied by each module in the trial layout. For example based on the trial layout of FIG. 11 partitioning engine 106 would determine that the four rectangular areas 121'–124' of substrate 125 as illustrated in FIG. 12 would likely be sufficient to hold all of the cells of a corresponding one of the four modules. Partitioning engine 106 chooses the shapes and positions of areas 121'–124' so that they have approximately the same centroids and aspect ratios as those of corresponding areas 121–124 of FIG. 11, but in addition to making areas 121'–124' more rectilinear in shape than areas 121–124, partitioning engine 106 also makes areas 121'–124' proportionately smaller than corresponding areas 121–124 so that areas 121'–124' do not overlap one another.

Figure 13:
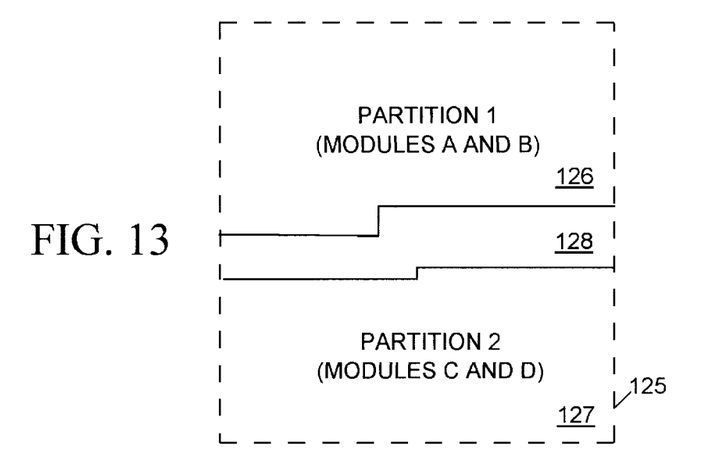

Partitioning engine 106 then groups the modules corresponding to areas 121' and 122' into one partition and groups modules corresponding to areas 123' and 124' into the other partition. Partitioning engine 106 then produces a floorplan as illustrated in FIG. 13, which reserves an area 126 for cells forming the partition to include modules A and B and reserves an area 127 for cells forming the partition to include modules C and D. Areas 128 of substrate 125 not included in partition areas 126 and 127 are reserved for signal routing paths between the partitions and for individual cells at the level of the hierarchy of modules A–D that are not included in any of modules A–D.

Partitioning engine 106 also develops a pin assignment plan indicating where signals passing between partitions 1 and 2 are to cross the boundaries of areas 126 and 128. Partitioning engine 106 positions the crossing points of those signals as near as possible to the positions within the trial layout of FIG. 11 of cells that terminate those signals. The floorplan and the pin assignment plan form the partitioning engine's output partitioning plan.

Timing Budget

In addition to developing a gate level netlist describing the IC, the IC designer also establishes a set of timing constraints for the circuit. A typical timing constraint references a pair of nodes in the circuit linked through one or more cells and indicates a maximum allowable signal path delay between the two nodes. Since the signal path delay between two nodes increases with the distance between the two nodes, the IC layout system tries to position the two nodes sufficiently close together to meet the signal path delay timing constraint.

When partitioning engine 106 divides the design into two or more partitions to be independently placed and routed, a signal path between two nodes can extend across partition boundaries when the two nodes are placed in separate partitions. Thus it is necessary when partitioning a design to also partition the timing constraints on signal paths extending across partition boundaries.

Figure 14:
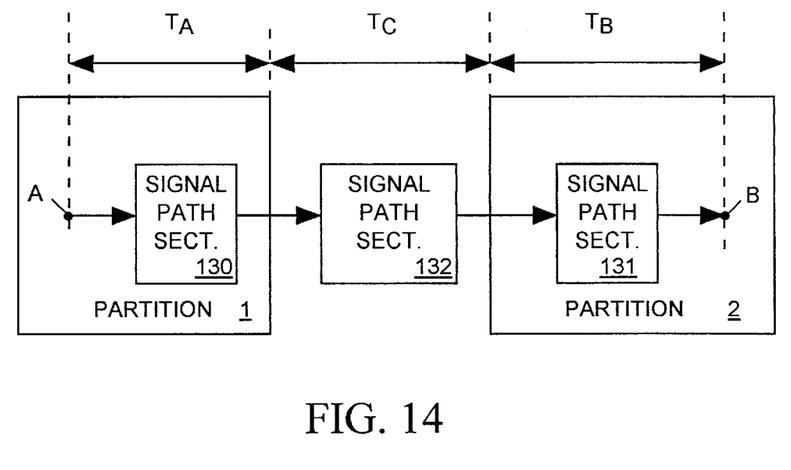
FIG. 14 is a block diagram illustrating a signal path having a timing constraint.

FIG. 14 illustrates an example wherein a signal path extends between a circuit node A within a partition 1 and a node B within a partition 2. If the maximum signal path delay between the two nodes A and B is constrained to T ns, then a first portion $T_A$ of the T ns must be allocated to the portion 130 of the signal path residing in partition 1, a second portion $T_B$ of the T ns must be allocated to the portion 131 of the signal path residing in partition 2, and a third portion $T_C$ of the T ns must allocated to the portion 132 of the signal path, if any, extending between partitions 1 and 2.

Accordingly layout system 101 includes a timing analysis and budgeting (TAB) engine 108 for dividing timing constraints among the partitions. For each path for which there is a timing constraint, TAB engine 108 checks the modified netlist to determine which cells are in the signal path to which the constraint applies. The cell library indicates the path delay through each cell, and TAB engine 108 checks the cell library entry for each cell in the time-constrained signal path to determine the path delay for that cell. TAB engine 108 also employs a conventional "RC extraction" tool to determine the delay of routing paths described in the trial layout that interconnect the cells forming the time-constrained signal path.

TAB engine 108 next determines whether the constrained signal path cuts across partition boundaries. If so TAB engine 108 allocates a separate portion of the constraint to each partition though which the path extends. Since P&R tool 104 is not allowed enough time to ensure that the trial layout satisfies all constraints, the sum T' of the delays through the cells of the constrained path and through their interconnecting signal routing structures as described in the trial layout may be greater or smaller than time constraint T for that path. However the trial layout does provide a reasonable basis for allocating the timing constraint among partitions.

For example, when the calculated delay for path sections 130, 131 and 132 of FIG. 14 are $T'_A$, $T'_B$, and $T'_C$, respectively, based on the analysis of the trial placement, the total path delay for that path in the trial placement is T' ns, and the constraint for that path is T ns, then TAB engine 108 calculates timing constraints $T_A$, $T_B$ and $T3_C$ for path sections 130, 131 and 132, respectively, as follows:

$$T_A = (T'_A/T')T.$$

$$T_B = (T'_B/T')T.$$

$$T_C = (T'_C/T')T.$$

Since $T = T_A + T_B + T_C$, the timing constraint T for the entire signal path is fully distributed to the three path sections in proportion to their calculated delays in the trial placement. TAB engine 108 partitions all signal path timing constraints in a similar manner and produces a "timing budget" indicating results of the timing constraint allocations.

In addition to producing the partitioning plan including the floorplan and pin assignment plan for each partition, partition engine 106 divides the modified netlist for the entire IC into several "partition netlists", each describing only the portion of the IC to be included in a corresponding one of the partitions. Partitioning engine 106 also produces a "top-level" netlist covering the entire IC which treats the partitions as large "cells" and indicates how the partitions are to be interconnected. The top level net list also describes any portion of the circuit that may not be included in one of the partitions.

One or more conventional P&R tools 110 then separately lays out each partition. (One P&R tool 110 could successively layout each partition, or each of several P&R tools 110 running on separate computers could concurrently lay out separate partitions.) Based on the top-level netlist supplied by partitioning engine 106, P&R tool 112 produces a "top-level" layout of the entire IC, which incorporates the partition layouts produced by P&R tools 110. The partitioning plan produced by partition engine 106 provides each P&R tool 110 with the spatial constraints it is to try to meet when placing cells within a partition. The partitioning plan also provides the spatial constraint information to top level P&R tool 112. The timing budget produced by TAB engine 108 provides each layout tool 110 and 112 with the timing constraints it is to try to meet when determining where to position cells and how to route paths between them.

A netlist compiler 114 converts the full chip IC layout produced by P&R tools 110 and 112 into a "layout level" netlist which models not only the behavior of the cells, but also of the structures P&R tools 110 and 112 designed to interconnect the cells. Various simulation and verification tools 116 then analyzes the layout level netlist to determine whether the IC layout satisfies all of the IC's constraints.

P&R tools 110 and 112 try to generate layouts that satisfy the all constraints, but when one of P&R tools 110 or 112 can't generate a layout satisfying all of its constraints, it produces as its output layout the layout that comes as close as possible to satisfying the constraints. If constraint checking tools 116 find the layout to be satisfactory, the layout process is complete. However if tools 114 detect that the layout fails to meet all of the various timing or spatial constraints, the layout level netlist produced by compiler 114 is returned to partitioning engine 106 and TAB engine 108. Partitioning engine 106 then produces a new partition plan based on the IC layout produced by tools 110 and 112 rather than on the trial layout produced by P&R tool 104.

Recall that the allocations of spatial and timing constraints placed on the partitions by the partitioning plan and the timing budget were estimates based on an analysis of the trail layout produced by P&R tool 104. It is therefore possible, for example, for the partitioning plan based on those preliminary estimates to allocate too little space to one partition and too much space to another. Or TAB engine 108 may allocate too much of a path's timing constraint to portions of a path within one partition and not enough to portions of the path within another partition. When there is a layout failure in which the IC layout produced by P&R tools 110 and 112 does not meet all spatial or timing constraints, the IC layout they do produce nonetheless provides a much better basis than the trail layout for estimating the size and shape of the area each partition requires, and for estimating the signal path delays within each partition.

Therefore when there is a layout failure, partition engine 106 and TAB engine 108 create a new partition plan and timing budget based on the IC layout produced by P&R tools 110 and 112 rather than on the trial layout produced by P&R tool 104. Since the new partition plan and timing budget more accurately allocate spatial and timing constraints to the partitions, P&R tools 110 and 112 are more likely to be able to produce a layout satisfying all constraints when they repeat the layout process based on the new partition plan and timing budget. When a layout satisfying the designer's constraints is possible, the iterative planning and layout process will quickly converge to a satisfactory IC layout.

In cases where the system still cannot converge to an acceptable layout, it can be helpful for the designer to increase the number M of cells clustering engine 102 includes in the modified netlist and to then restart the entire layout process. This increases the amount of time system 101 needs to generate a layout, but it also gives P&R tools 110 and 112 more flexibility in how they place cells, and that can help them to overcome problems they may have in satisfying the various timing or spatial constraints.

Thus initially the designer using system 101 may want to choose a relative large value of M to keeping the number of cells in the clustered netlist relative small, thereby enabling layout system 101 to quickly produce an IC layout which may satisfy all constraints. However should system 101 fail to produce a satisfactory layout after several partitioning/layout cycles, the designer can reduce the value of M and restart the process.

The forgoing specification and the drawings depict the best mode(s) of practicing the invention, and elements or steps of the depicted best mode(s) exemplify the elements or steps of the invention as recited in the appended claims. However the appended claims are intended to apply to any mode of practicing the invention comprising the combination of elements or steps as described in any one of the claims, including elements or steps that are functional equivalents of the example elements or steps depicted in the specification and drawings. Accordingly should any appended claim describe an element or step only in terms of its function, then it is intended that the claim's description of the element be interpreted as reading on any element or step having the described function, regardless of any structural limitations associated with any example depicted in this specification or in the drawings.

What is claimed is:

1. A method for an automated placement and routing (P&R) tool for designing a layout on a constrained area of a semiconductor substrate of an integrated circuit (IC) described by a first netlist as interconnected cells organized into a hierarchy of circuit modules, wherein the cells form signal paths subject to signal path delay constraints, wherein the P&R tool includes a cell library containing a description of each cell of the IC, and wherein the first netlist identifies each cell by reference to its description in the cell library, the method comprising the steps of:

a. modifying the first netlist to produce a second netlist also describing the IC as being interconnected cells organized into a hierarchy of circuit modules, wherein while the first netlist describes a portion of the IC as being implemented by a group of cells, the second netlist describes the same portion of the IC as being implemented by a single cell;

b. producing a trial layout of the IC as described by the second netlist in accordance with cell descriptions included in the cell library in a manner that is biased toward positioning most closely interconnected cells nearest one to another in the semiconductor substrate; and c. producing estimates of areas of semiconductor substrate needed to separately contain circuit modules of the IC described by the second netlist based on positions within the trial layout of cells forming those circuit modules.

2. The method in accordance with claim 1 wherein step a comprises the substeps of:
   a1. processing the first netlist to identify circuit modules formed by a number of cells falling within a predetermined first range; and
   a2. modifying the first netlist to produce the second netlist, wherein while the first netlist describes said portion of the IC as being implemented by said group of cells included within one of the circuit modules identified at step a1, the second netlist describes the same portion of the IC as being implemented by said single cell.

3. The method in accordance with claim 2 wherein step a2 comprises the substeps of:
   a21. processing the first netlist to generate a first count of cells of the IC that are included in the circuit modules identified at step a1 and to generate a second count of cells of the IC that are external to the circuit modules identified at step a1;
   a22. based on the first and second counts, calculating a first target number of cells or each group that would reduce a total number of cells in the IC as described by the first netlist to a second target number of cells in the IC to be described by the second netlist; and
   a23. modifying the first netlist to produce the second netlist in a manner that is biased toward including the first target number of cells in each group the second netlist identifies as being a single cell such that the total number of cells included in the IC defined by the second netlist approximates the second target number.

4. The method in accordance with claim 2 wherein step a further comprises the substep of:
   a3. altering the cell library to include a description of said single cell, wherein the second netlist identifies the single cell by reference to its description in the cell library.

5. The method in accordance with claim 1 further comprising the step of:
   d. processing the second netlist to produce a plurality of partition netlists, each partition netlist corresponding to and describing a separate partition of the IC, each partition including a separate set of the IC's circuit modules.

6. The method in accordance with claim 5 further comprising the step of:
   e. generating a partition plan separately allocating to each partition of the IC a semiconductor substrate area of size determined in accordance with the estimates produced at step c of areas of semiconductor substrate needed to separately contain circuit modules included in each partition.

7. The method in accordance with claim 6 further comprising the step of:
   f. for each signal path subject to a timing constraint, analyzing the trial layout and the second netlist to generate an estimate of a signal path delay through each portion of the signal path residing within each partition; and
   g. generating a timing budget allocating a separate part of the timing constraint for each signal path portion residing within each partition in proportion to the signal path delay of that signal path portion estimated at step f.

8. The method in accordance with claim 7 further comprising the step of:
   h. separately processing the partition netlists to generate separate partition layouts for their corresponding portions of the circuit modules, wherein layouts of individual cells are determined in accordance with the descriptions of the cells included in the cell library, wherein the semiconductor substrate area the partition plan allocates to each partition and the portion of each timing constraint the timing budget allocates to each portion of each signal path subject to the timing constraint act as constraints on cell placement within each partition layout.

9. The method in accordance with claim 8 further comprising the step of:
   i. producing a top level layout for the entire IC incorporating the partition layouts produced at step h.

10. The method in accordance with claim 9
    wherein a portion of at least one signal path subject to a timing constraint resides outside all partitions,
    wherein the timing budget includes an allocation of a part of that signal path's timing constraint to that portion of the signal path, and
    wherein that allocation acts as a constraint on the top level layout produced at step i.

11. The method in accordance with claim 8 wherein step a comprises the substeps of:
    a1. processing the first netlist to identify circuit modules formed by a number of cells falling within a predetermined first range; and
    a2. modifying the first netlist to produce the second netlist, wherein while the first netlist describes said portion of the IC as being implemented by said group of cells included within one of the circuit modules identified at step a1, the second netlist describes the same portion of the IC as being implemented by said single cell.

12. The method in accordance with claim 11 wherein step a further comprises the substep of:
    a3. altering the cell library to include a description of said single cell, wherein the second netlist identifies the single cell by reference to its description in the cell library.

13. The method in accordance with claim 12 wherein step a2 comprises the substeps of:
    a21. processing the first netlist to generate a first count of cells of the IC that are included in the circuit modules identified at step a1 and to generate a second count of cells of the IC that are external to the circuit modules identified at step a1;
    a22. based on the first and second counts, calculating a first target number of cells for each group that would reduce a total number of cells in the IC as described by the first netlist to a second target number of cells in the IC to be described by the second netlist; and
    a23. modifying the first netlist to produce the second netlist in a manner that is biased toward including the first target number of cells in each group the second netlist identifies as being a single cell such that the total number of cells included in the IC defined by the second netlist approximates the second target number.

14. A method for an automated placement and routing (P&R) tool for converting a first netlist describing an integrated circuit (IC) into a second netlist describing the same IC, wherein the first and second netlists each describe the IC as interconnected cells organized into a hierarchy of circuit modules, wherein the P&R tool includes a cell library containing a description of each cell of the IC described by the first netlist, and wherein the first netlist identifies each cell of the IC by reference to its description in the cell library, the method comprising the steps of:

a. processing the first netlist to identify circuit modules formed by a number of cells falling within a predetermined first range; and b. modifying the first netlist to produce the second netlist, wherein while the first netlist describes a portion of the IC as being implemented by a group of cells included within one of the circuit modules identified at step a, the second netlist describes the same portion of the IC as being implemented by a single cell.

15. The method in accordance with claim 14 wherein step b comprises the substeps of b1. processing the first netlist to generate a first count of cells of the IC that are included in the circuit modules identified at step a and to generate a second count of cells of the IC that are external to the circuit modules identified at step a;

b2. based on the first and second counts, calculating a first target number of cells for each group that would reduce a total number of cells in the IC as described by the first netlist to a second target number of cells in the IC described by the second netlist; and b3. modifying the first netlist to produce the second netlist in a manner that is biased toward including the first target number of cells in each group the second netlist identifies as being a single cell such that the total number of cells included in the IC defined by the second netlist approximates the second target number.

16. The method in accordance with claim 14 further comprising the substep of:

c. altering the cell library to include a description of said single cell, wherein the second netlist identifies the single cell by reference to its description in the cell library.

17. Computer readable media containing program instructions for converting a computer executing the program instructions into an automated placement and routing (P&R) tool for designing a layout on a constrained area of a semiconductor substrate of an integrated circuit (IC) described by a first netlist as interconnected cells organized into a hierarchy of circuit modules, wherein the cells form signal paths subject to signal path delay constraints, wherein the P&R tool includes a cell library containing a description of each cell of the IC, and wherein the first netlist identifies each cell by reference to its description in the cell library, the computer readable media comprising:

first program instructions for modifying the first netlist to produce a second netlist also describing the IC as being interconnected cells organized into a hierarchy of circuit modules, wherein while the first netlist describes a portion of the IC as being implemented by a group of cells, the second netlist describes the same portion of the IC as being implemented by a single cell;

second program instructions for producing a trial layout of the IC as described by the second netlist in accordance with cell descriptions included in the cell library in a manner that is biased toward positioning most closely interconnected cells nearest one to another in the semiconductor substrate; and third program instructions for producing estimates of areas of semiconductor substrate needed to separately contain circuit modules of the IC described by the second netlist based on positions within the trial layout of cells forming those circuit modules.

18. The computer readable media in accordance with claim 17 wherein the first program instructions comprise:

fourth program instructions for processing the first netlist to identify circuit modules formed by a number of cells falling within a predetermined first range; and fifth program instructions for modifying the first netlist to produce the second netlist, wherein while the first netlist describes said portion of the IC as being implemented by said group of cells included within one of the identified circuit modules, the second netlist describes the same portion of the IC as being implemented by said single cell.

19. The computer readable media in accordance with claim 18 wherein the fifth program instructions comprise:

program instructions for processing the first netlist to generate a first count of cells of the IC that are included in the identified circuit modules and to generate a second count of cells of the IC that are external to the identified circuit modules identified;

program instructions for, based on the first and second counts, calculating a first target number of cells for each group that would reduce a total number of cells in the IC as described by the first netlist to a second target number of cells in the IC to be described by the second netlist; and program instructions for modifying the first netlist to produce the second netlist in a manner that is biased toward including the first target number of cells in each group the second netlist identifies as being a single cell such that the total number of cells included in the IC defined by the second netlist approximates the second target number.

20. The computer readable media in accordance with claim 18 wherein the first program instructions further comprise:

program instructions for altering the cell library to include a description of said single cell, wherein the second netlist identifies the single cell by reference to its description in the cell library.

21. The computer readable media in accordance with claim 17 further comprising:

program instructions for processing the modified netlist to produce a plurality of partition netlists, each partition netlist corresponding to and describing a separate partition of the IC, each partition including a separate set of the IC's circuit modules.

22. The computer readable media in accordance with claim 21 further comprising:

program instructions for generating a partition plan separately allocating to each partition of the IC a semiconductor substrate area of size determined in accordance with the produced estimates of areas of semiconductor substrate needed to separately contain circuit modules included in each partition.

23. The computer readable media in accordance with claim 22 further comprising:

program instructions which, for each signal path subject to a timing constraint, analyze the trial layout and the second netlist to generate an estimate of a signal path delay through each portion of the signal path residing within each partition; and program instructions for generating a timing budget allocating a separate part of the timing constraint for each signal path portion residing within each partition in proportion to the estimated signal path delay of that signal path portion.

24. The computer readable media in accordance with claim 23 further comprising:

program instructions for separately processing the partition netlists to generate separate partition layouts for their corresponding portions of the circuit modules, wherein layouts of individual cells are determined in accordance with the descriptions of the cells included in the cell library, wherein the semiconductor substrate area the partition plan allocates to each partition and the portion of each timing constraint the timing budget allocates to each portion of each signal path subject to the timing constraint act as constraints on cell placement within each partition layout.

25. The computer readable media in accordance with claim 24 further comprising:

program instructions for producing a top level layout for the entire IC incorporating the partition layouts.

26. The computer readable media in accordance with claim 25 wherein a portion of at least one signal path subject to a timing constraint resides outside all partitions, wherein the timing budget includes an allocation of a part of that signal path's timing constraint to that portion of the signal path, and wherein that allocation acts as a constraint on the top level layout.

27. The computer readable media in accordance with claim 24 wherein the first program instructions comprise:

program instructions for processing the first netlist to identify circuit modules formed by a number of cells falling within a predetermined first range; and program instructions for modifying the first netlist to produce the second netlist, wherein while the first netlist describes said portion of the IC as being implemented by said group of cells included within one of the identified circuit modules, the second netlist describes the same portion of the IC as being implemented by said single cell.

28. The computer readable media in accordance with claim 27 wherein the first program instructions further comprise:

program instructions for altering the cell library to include a description of said single cell, wherein the second netlist identifies the single cell by reference to its description in the cell library.

29. The computer readable media in accordance with claim 28 wherein the second program instructions comprise:

program instructions for processing the first netlist to generate a first count of cells of the IC that are included in the identified circuit modules and to generate a second count of cells of the IC that are external to the identified circuit modules;

program instructions which, based on the first and second counts, calculate a first target number of cells for each group that would reduce a total number of cells in the IC as described by the first netlist to a second target number of cells in the IC to be described by the second netlist; and program instructions for modifying the first netlist to produce the second netlist in a manner that is biased toward including the first target number of cells in each group the second netlist identifies as being a single cell such that the total number of cells included in the IC defined by the second netlist approximates the second target number.

30. Computer readable media containing program instructions for converting a computer executing the program instructions into an automated placement and routing (P&R) tool for converting a first netlist describing an integrated circuit (IC) into a second netlist describing the same IC, wherein the first and second netlists each describe the IC as interconnected cells organized into a hierarchy of circuit modules, wherein the P&R tool includes a cell library containing a description of each cell of the IC described by the first netlist, and wherein the first netlist identifies each cell of the IC by reference to its description in the cell library, the computer readable media comprising:

first program instructions for processing the first netlist to identify circuit modules formed by a number of cells falling within a predetermined first range; and second program instructions for modifying the first netlist to produce the second netlist, wherein while the first netlist describes a portion of the IC as being implemented by a group of cells included within one of the identified circuit modules, the second netlist describes the same portion of the IC as being implemented by a single cell.

31. The computer readable media in accordance with claim 30 the first program instructions comprise:

program instructions for processing the first netlist to generate a first count of cells of the IC that are included in the identified circuit modules and to generate a second count of cells of the IC that are external to the identified circuit modules;

program instructions which, based on the first and second counts, calculate a first target number of cells for each group that would reduce a total number of cells in the IC as described by the first netlist to a second target number of cells in the IC described by the second netlist; and program instructions for modifying the first netlist to produce the second netlist in a manner that is biased toward including the first target number of cells in each group the second netlist identifies as being a single cell such that the total number of cells included in the IC defined by the second netlist approximates the second target number.

32. The computer readable media in accordance with claim 30 further comprising:

program instructions for altering the cell library to include a description of said single cell, wherein the second netlist identifies the single cell by reference to its description in the cell library.

* * * * *